United States Patent
Balajan et al.

(10) Patent No.: US 12,313,755 B2
(45) Date of Patent: May 27, 2025

(54) VESSEL TRACKING

(71) Applicant: WISETECH GLOBAL (LICENSING) PTY LTD, Alexandria (AU)

(72) Inventors: James Balajan, Sydney (AU); Thomas Shafron, Sydney (AU); Tobias Däullary, Sydney (AU)

(73) Assignee: Wisetech Global (Licensing) Pty Ltd, Alexandria (AU)

( * ) Notice: Subject to any disclaimer, the term of this patent is extended or adjusted under 35 U.S.C. 154(b) by 483 days.

(21) Appl. No.: 17/587,385

(22) Filed: Jan. 28, 2022

(65) Prior Publication Data
US 2022/0244408 A1 Aug. 4, 2022

(30) Foreign Application Priority Data
Jan. 29, 2021 (AU) .................................. 2021900195

(51) Int. Cl.
*G01S 19/50* (2010.01)
*G01S 19/39* (2010.01)

(52) U.S. Cl.
CPC ............ *G01S 19/50* (2013.01); *G01S 19/393* (2019.08)

(58) Field of Classification Search
CPC ...... G01S 19/50; G01S 19/393; G01S 5/0269; G01S 19/51; G01S 2205/04;
(Continued)

(56) References Cited

U.S. PATENT DOCUMENTS

| 2008/0079608 | A1 | 4/2008 | Morrell | |
| 2015/0046361 | A1* | 2/2015 | Williams | ............. G06Q 10/083 |
| | | | | 705/330 |

(Continued)

FOREIGN PATENT DOCUMENTS

| CN | 107341573 A | * | 11/2017 | ............. G06Q 10/04 |
| CN | 110750571 A | * | 2/2020 | |
| CN | 109615932 B | * | 7/2020 | ............... G08G 3/00 |

OTHER PUBLICATIONS

CN109615932B_Description_Apr. 19, 2024_0851.pdf—translation of CN109615932B (Year: 2020).*

(Continued)

*Primary Examiner* — Olumide Ajibade Akonai
*Assistant Examiner* — Yonghong Li
(74) *Attorney, Agent, or Firm* — Fenwick & West LLP; Daniel R. Brownstone

(57) ABSTRACT

This disclosure provides a data-driven approach to departure detection. In particular, the disclosed approach uses location data, such as GPS, which is readily available for many vessels globally and historically through the automatic identification system (AIS). The approach clusters this data and then constructs a convex hull around these clusters for each port to define a port area. A vessel is then determined as departed when it leaves that port area. Clustering is computationally efficient as a number of optimised algorithms exist, which means even a very large dataset like historical locations of thousands of vessels can be processed relatively quickly. Further, the departure detection enables accurate estimation of arrival times. Further, actions can be triggered by the departure determination, such as automatic control of cranes, trucks, trains and other port equipment.

14 Claims, 5 Drawing Sheets

(58) Field of Classification Search
CPC ... G01S 5/0036; G06Q 10/0833; G06Q 10/083; G01C 21/203; G08G 3/00
See application file for complete search history.

(56) References Cited

U.S. PATENT DOCUMENTS

| | | | |
|---|---|---|---|
| 2015/0134558 A1* | 5/2015 | Murray | G06Q 10/0833 705/333 |
| 2021/0081890 A1* | 3/2021 | Atwood | G06Q 10/0833 |

OTHER PUBLICATIONS

CN110750571A_Description_Apr. 18, 2024_1103.pdf—translation of CN110750571A (Year: 2020).*
CN110750571A_Fig.2_translate.pdf—translation of CN110750571A Fig.2 (Year: 2020).*
CN_107341573_A_I_translate.pdf—translation of CN107341573A (Year: 2017).*
Kontopoulos, I. et al., "A distributed framework for extracting maritime traffic patterns," International Journal of Geographical Information Science 35(4), Jul. 15, 2020, pp. 767-792.

* cited by examiner

VESSEL TRACKING

CROSS-REFERENCE TO RELATED APPLICATIONS

This application claims priority to Australian provisional patent application 2021900195, filed on 29 Jan. 2021, which is incorporated by reference.

TECHNICAL FIELD

This disclosure relates to tracking vessels.

BACKGROUND

A large number of vessels, such as cargo ships, are constantly transporting goods around the globe. In order to ensure the safe and efficient operation of those vessels, it is important to monitor their locations over time, which is referred to as tracking. One existing tracking solution is based on the automatic identification system (AIS). The AIS is a maritime communications device. It uses the very high frequency (VHF) radio broadcasting system to transfer data. AIS equipped vessels (shipborne AIS) and shore based stations (non-shipborne AIS) can use it to send and receive identifying information. This identifying information can be displayed on an electronic chart, computer display, chart plotter or compatible navigation radar.

AIS improves navigation safety and environmental protection by assisting in the effective navigation of ships. One aim of AIS is to aid in situational awareness and therefore provide a means to assist in collision avoidance. To that end, AIS data from one vessel is received by all vessels within VHF communication range of the sending vessel. The receiving vessels can display all received AIS data on one screen to provide a real-time situational awareness of vessels in the vicinity without the need for data network connectivity.

In addition to the location-specific processing and display, it is possible to receive AIS data at various stations on land and save that data for further use. In particular, it is possible to transmit that data to a server, where AIS data from multiple different receiving stations is collated into a single dataset of vessel locations globally.

While this dataset enables to determine the accurate location of each vessel in real-time, it cannot provide an indication of whether a vessel has departed from a particular port. Therefore, any predictions (i.e. for ETA) about a vessel's movements are inaccurate. It is desirable to have an accurate ETA.

Current methods often provide an inaccurate ETA because it is difficult to determine that a vessel has actually departed from a port. One difficulty with this determination, is that vessels wait at an anchorage point and may enter the port only to return to their anchorage point for further wait. It is difficult for current methods based on AIS data to distinguish between vessels moving to or from the waiting area and vessels having departed and moving towards their destination port. As a result, the ETA becomes wildly inaccurate. In particular, the ETA is earlier than the actual time of arrival because the vessel was deemed to have departed where, in fact, the vessel only moved to a waiting position.

Therefore, there is a need for more accurate vessel tracking that reduces false positives and is also computationally efficient since the data available on vessel movement is large and can easily lead to computational overload.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

This disclosure provides a data-driven approach to departure detection. In particular, the disclosed approach uses location data, such as GPS, which is readily available for many vessels globally and historically through the automatic identification system (AIS). The approach clusters this data and then constructs a convex hull around these clusters for each port to define a port area. A vessel is then determined as departed when it leaves that port area. The advantage is that clustering is computationally efficient as a number of optimised algorithms exist, which means even a very large dataset like historical locations of thousands of vessels can be processed relatively quickly. Further, the departure detection enables accurate estimation of arrival times, which is another technical advantage. Further, actions can be triggered by the departure determination, such as automatic control of cranes, trucks, trains and other port equipment.

A method for vessel tracking in relation to a port comprises:
 receiving geographical location data indicative of geographical locations of respective vessels;
 clustering the geographical locations of the vessels to determine clusters;
 determining a port area that bounds the clusters; and
 determining tracking data indicative of movement of a tracked vessel based on whether the tracked vessel is within the port area.

In some embodiments, the port area is defined by a polygon. In some embodiments, the method further comprises determining corners of the polygon to bound the clusters by the polygon. In some embodiments, the polygon is a convex hull of the geographical locations in the clusters.

In some embodiments, the port area bounds the clusters and multiple berths in the port. In some embodiments, the port area is defined by a polygon and the multiple berths are corners of the polygon.

In some embodiments, the port area comprises one or more of an anchorage, a waiting area, and idle area.

In some embodiments, determining the tracking data comprises detecting a departure of the tracked vessel.

In some embodiments, detecting the departure comprises detecting vessel movement from within the port area to outside the port area. In some embodiments, the method further comprises determining an estimated time of arrival based on detecting the departure of the tacked vessel. In some embodiments, the departure is detected by a first software system and the method further comprises generating, by the first software system, an event to notify a second software system of the detected departure. In some embodiments, the method further comprises triggering, by the event, an action performed by the second software system.

In some embodiments, the method further comprises determining selected vessels that are associated with the port and clustering the selected vessels, wherein selecting vessels is based on vessel data indicative of a destination of the selected vessels being the port. In some embodiments, selecting vessels comprises filtering vessel movement data by destination.

In some embodiments, selecting vessels comprises determining vessels that are stationary and selecting the stationary vessels. In some embodiments, determining vessels that are stationary comprises determining vessels where a change of the geographic location of the vessel over time is below a predetermined threshold.

In some embodiments, the geographical locations comprise multiple historical geographical locations for each vessel.

In some embodiments, determining the selected vessels comprises selecting vessels that have moved in a loop comprising the port and a waiting area outside the port.

In some embodiments, the method further comprises:
initialising the port area with an initial port area; and
adjusting the initial port area based on the clusters to determine the port area.

A computer system for vessel tracking in relation to a port comprises:
a data port configured to receive geographical location data indicative of geographical locations of respective vessels; and
a processor configured to:
cluster the geographical locations of the vessels to determine clusters;
determine a port area that bounds the clusters; and
determine tracking data indicative of movement of a tracked vessel based on whether the tracked vessel is within the port area.

A method for vessel tracking comprises:
detecting that a vessel has entered a port area at an entry point and exited the port area at the exit point;
determining an adjustment point based on the entry point and the exit point;
adjusting the port area by including the adjustment point;
determining tracking data indicative of movement of a tracked vessel based on whether the tracked vessel is within the port area.

In some embodiments, the port area comprises a polygon and including the adjustment point comprises using the adjustment point as a corner of the polygon.

In some embodiments, determining the adjustment point is based on:
an entry direction of travel of the vessel at the entry point, and
an exit direction of travel of the vessel at the exit point.

In some embodiments, determining the adjustment point comprises:
determining a centre point located centrally between the entry point and the exit point; and
adding a vector to the centre point based on the entry direction and the exit direction.

In some embodiments, the vector is a mean vector of the entry direction and the exit direction. In some embodiments, the vector is scaled by weighting factor.

In some embodiments, detecting that a vessel has entered a port area at the entry point and exited the port area at the exit point is conditional on that the vessel having entered the port area a second time. In some embodiments, the second time is within a predefined time period from a first time the vessel has entered the port area.

Software, when executed by a computer, causes the computer to perform the above methods.

A computer system for vessel tracking comprises a processor configured to:
detect that a vessel has entered a port area at an entry point and exited the port area at the exit point;
determine an adjustment point based on the entry point and the exit point;
adjust the port area by including the adjustment point;
determine tracking data indicative of movement of a tracked vessel based on whether the tracked vessel is within the port area.

Features that are provided as subsidiary features to one of the methods are also subsidiary features of the other one of the methods as well as the systems and the software

BRIEF DESCRIPTION OF DRAWINGS

An example will now be described with reference to the following drawings.

DESCRIPTION OF EMBODIMENTS

Vessel Tracking

Figure 1:
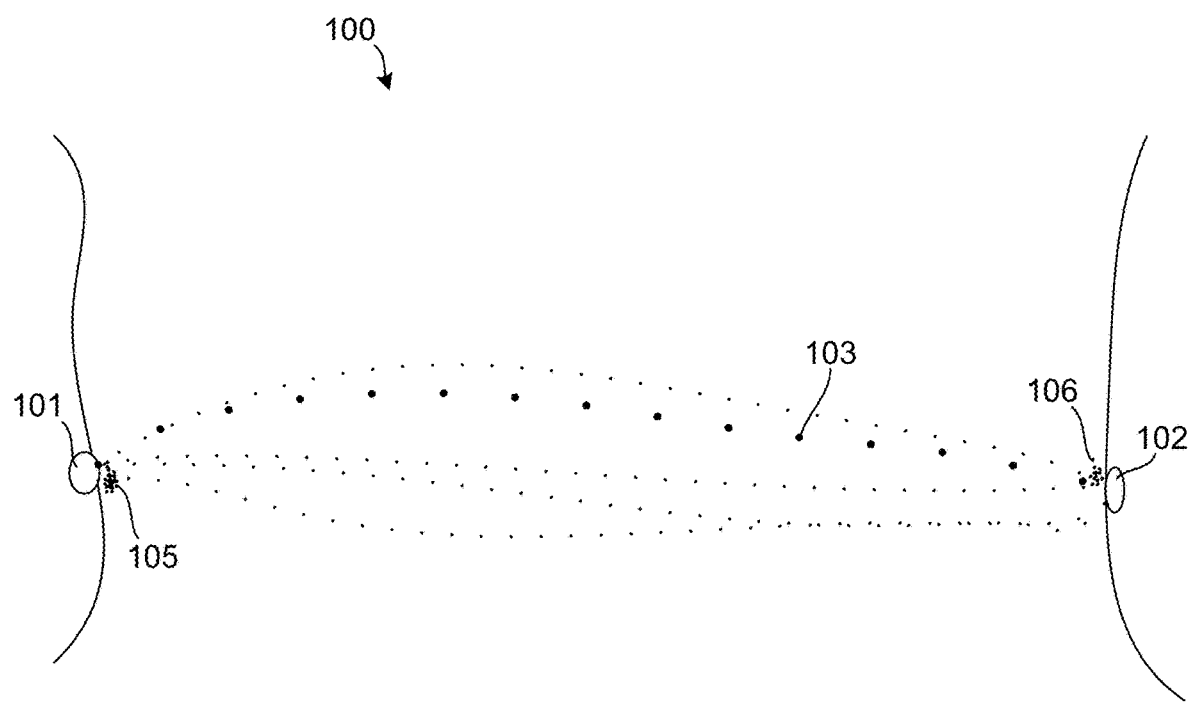
FIG. 1 illustrates an example shipping scenario.

As stated above, current methods for vessel monitoring are often inaccurate. Therefore, this disclosure provides methods that can accurately monitor vessel movements. More particularly, the disclosed methods can detect accurately that a vessel has departed from a port and is on route to its destination. Further, the number of vessels that are typically tracked is large, which means that computer systems that track those vessels can easily be overwhelmed if the computational complexity of the tracking software is not considered carefully. Therefore, the methods provided in this disclosure rely on clustering of geographical locations of the vessels. This clustering is computationally efficient and therefore, reduces the overall burden on the used computer systems.

It has been found that the result of the clustering can be used to define a physical area around a port. More particularly, the computer system determines a port area that bounds the calculated clusters, such as by calculating a convex hull of all points that belong to one of the clusters (but excluding points that are outside any cluster). This specific combination of clustering and convex hull algorithms results in an accurate mapping of vessel locations to a port area in the sense that vessels within the port area have not departed from the port and vessels outside the port area have departed from the port. Therefore, the definition of the port area is important for the tracking of vessels. It is noted that tracking may comprise the recording of a current GPS location and its display on a map. Improved tracking, however, provides contextual information that is augmented compared to the vessel location. Here, the contextual augmentation of the vessel location is the determination whether or not the vessel has departed from the port. Advantageously, this determination or flagging of vessels is accurately achieved through the accurate definition of the port area. Since the port area is accurate, the determination of whether the vessel has left the port area and then the determination that the vessel has departed from the port is also accurate.

It is further noted that, although the clustering and convex hull algorithms are highly efficient, these steps do not need to be performed for each vessel departing a port. This means the actual determination that a vessel has departed is a low-complexity operation of determining whether the vessel is inside or outside the port area. On most computer systems, this determination should be performed within a few ms, so a large number of vessels can be tracked simultaneously.

The accurate determination of vessel departure can then be used to accurately calculate an estimated time of arrival. In turn, this can be used for port automation, where machinery, such as cranes and trucks, are controlled to perform certain operations before the estimated time of arrival, such as position themselves near the expected berth of the vessel. With previously available inaccurately estimated time of arrival, port automation is almost impossible because equipment would need to move back and forth to correct errors made in the vessel tracking. With the disclosed method, the estimated time of arrival is sufficiently accurate to automatically control port equipment to increase cargo throughput, reduce transit times, wear and tear and fuel consumption of vessels as well as port equipment.

Shipping Scenario

FIG. 1 illustrates an example shipping scenario 100 comprising a first port 101 and a second port 102. Multiple vessels travel between the first port 101 and the second port 102 during multiple trips. A trip is defined as a movement between one port to another port. In that sense, for some trips first port 101 may be the port of origin (or simply 'origin' herein) and second port 102 may be the destination port (or simply 'destination' herein). For other trips, second port 102 may be the origin while first port 101 is the destination.

The multiple trips are indicated by dotted lines. A trip 103 is highlighted in bold as an example. More particularly, the dots indicate the geographical locations (or simply 'location' herein) of the multiple vessels over time. These locations may be provided at regular intervals, such as every minute, or at irregular intervals such as every 1-5 minutes. The locations may be determined by a global positioning system (GPS) sensor on board the vessels. In some examples, the GPS sensor determines the position and a radio communication device sends the location in real-time to a server. Real-time in this context means the GPS sensor sends the location before the next location is determined. That is, the GPS sensor sends the location every minute, for example. In yet another example, the GPS sensor records the location on a data store and the locations are then uploaded as a batch to the server when the vessel is at or near a port. For some of the methods disclosed herein it is not relevant whether the location data is current or historical and outdated.

As mentioned above, the scenario 100 comprises multiple trips. While each trip in FIG. 1 is represented by a dotted line, each trip can also be considered as a subset of geographical locations that are associated with that trip. In that sense, such a subset associated with a trip is also associated with an corresponding origin and a corresponding destination. This can be useful for filtering trips, subsets of locations or locations as described further below.

It is also pointed out that FIG. 1 shows accumulations of recorded locations 105 and 106 near ports 101 and 102, respectively. The figures below show the accumulations more detailed. These accumulations are recordings from vessels that are stationary or slowly moving because they are directed to wait for an available berth. Since the vessel location is still recorded every minute, for example, but the vessel is stationary or slowly moving, the recording locations appear as an accumulation across a relatively small area.

It is noted that these accumulated locations are still part of a trip and are therefore associated with an origin and a destination. In many cases, the locations are accumulated only near the destination and not near the origin because vessels typically wait before they are unloaded at the berth. Once the vessel is unloaded and potentially re-loaded, it starts a new trip and is unlikely to wait before commencing its trip to the destination.

Port Operation

Figure 2:
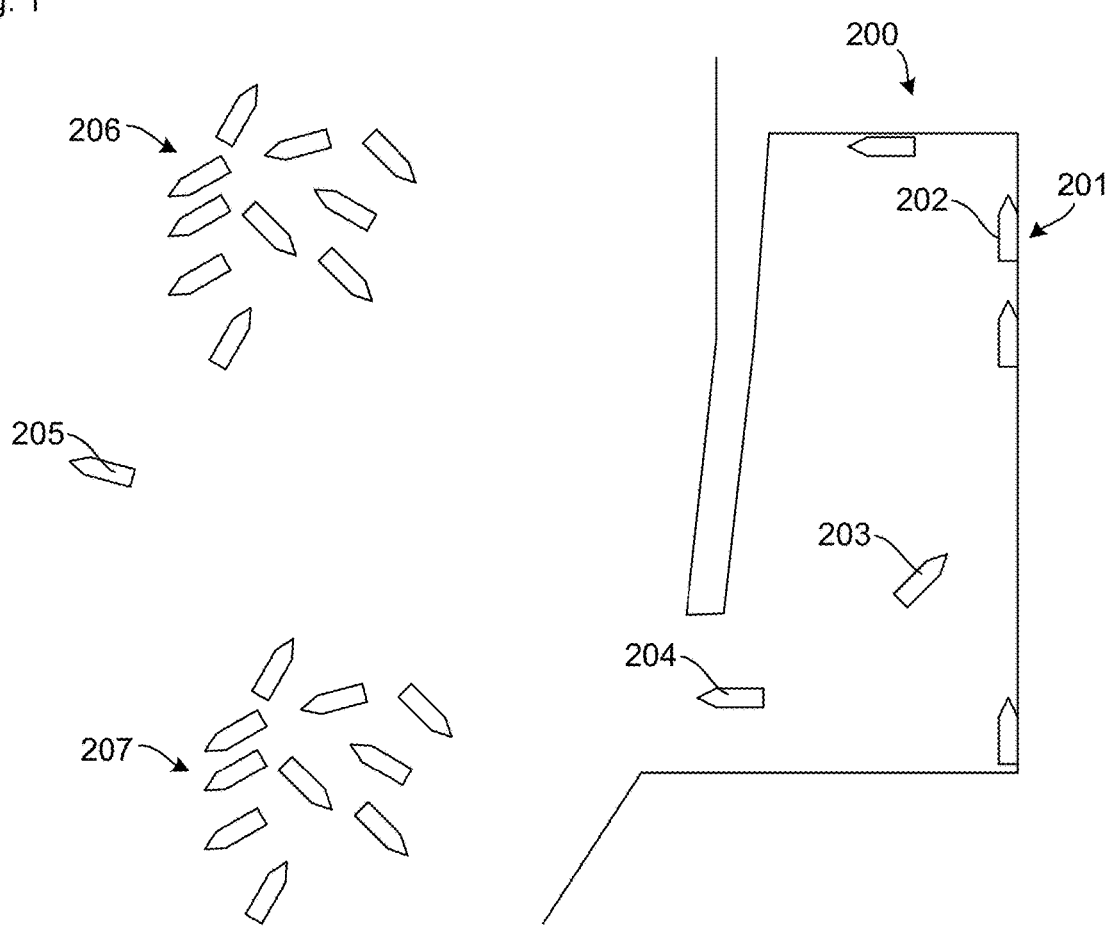
FIG. 2 illustrates an example port.

FIG. 2 illustrates an example port 200 comprising multiple berths, such as example berth 201. A vessel 202 is currently docked at berth 201. A further vessel 203 has entered the port 200 and is about to dock at another berth, while another vessel 204 is leaving the port 200 to head for a waiting area. Yet another vessel 205 has left the port and is heading for its destination port.

There is a first group of vessels 306 waiting in a first waiting area and a second group of vessels 207 waiting in a second waiting area. Each waiting area may be referred to as anchorage and there may be moorings provided or the vessels may drop their anchors while they wait for a free berth. In other examples, the waiting areas are areas where the vessels are idle (the engine is running but the propeller is not driven) or move very slowly in a waiting pattern, such as circles.

Computer Data Processing

Figure 3:
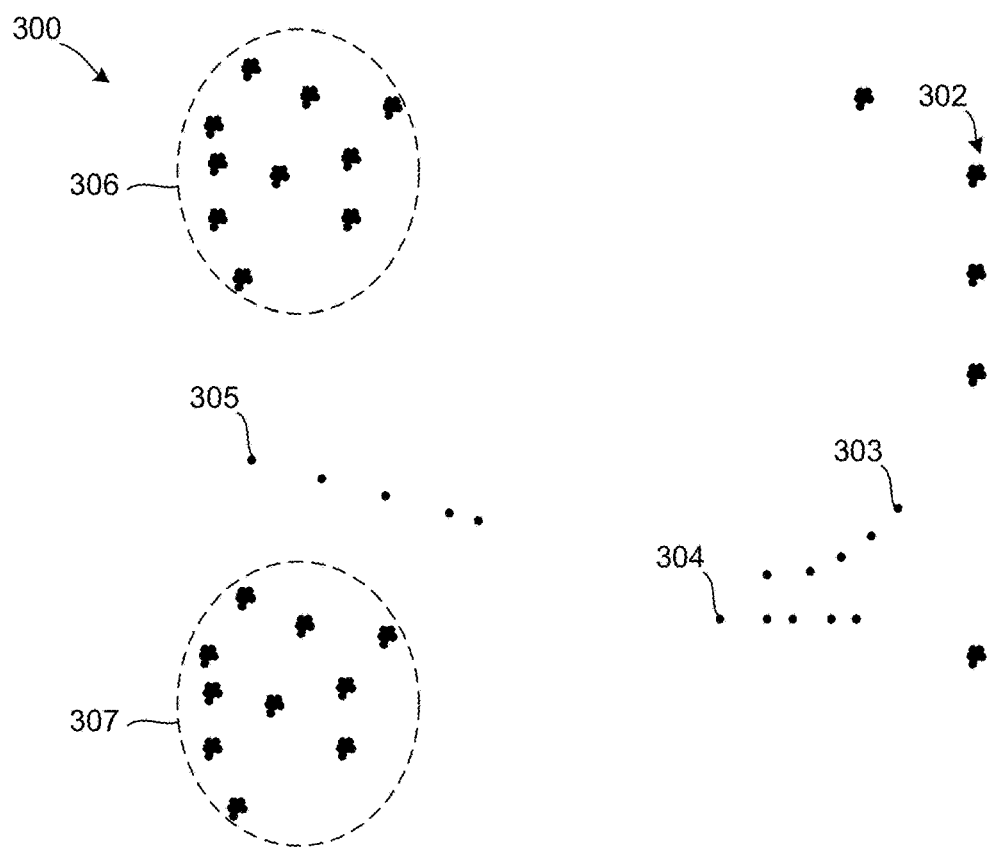
FIG. 3 illustrates geographical location data.

FIG. 3 illustrates the geographical location data 300 that is stored and processed on the server. The geographical location data 300 comprises multiple records represented as dots in FIG. 3 and in this example, the records are generated by the vessels shown in FIG. 2. The 2D location of the dots in FIG. 3 indicates the longitude and latitude of each geographical location. Each dot, that is, each record of the geographical location data 300 represents a geographical location of a respective vessel. In computer memory, each dot may be stored as a record in a database table and each record has fields for latitude and longitude as recorded by the GPS sensor. The records may include further fields, such as a time stamp, trip identifier, vessel identifier, etc. There may be separate tables for trip records including origin and destination so that multiple geographical locations can be associated with a single trip.

It is noted that in FIG. 3 there are multiple dots for each vessel in FIG. 2 because each vessel in FIG. 2 records its locations periodically, which, over time, creates multiple records for that vessel. In FIG. 3, it is easy to see which vessels are moving and which vessels are stationary. When reference is made herein to 'stationary' this is to be understood not as an absolute term but in the sense of remaining in a vicinity as opposed to heading towards a destination. So for example, a vessel that is anchored remains 'stationary' in this sense even if the vessel sways as a result of changing tidal currents, for example.

So vessel 202 in FIG. 2 is stationary as it is docked at berth 201. As a result, there is an accumulation of closely spaced records 302 as vessel 202 keeps recording almost the same location (subject to GPS error). In contrast, vessel 203 moves towards a berth and is currently at a current location 303. As a result of its movement, there is now a trail indicative of historical locations of vessel 203. Similarly, vessel 204 in FIG. 2 moves out of the port and as a result, there is current location 304 and a trail of historical locations.

Clustering

The server can now cluster the locations of the vessels to determine multiple clusters. This clustering may be based on a distance measure, such as a geographical distance. The distance may be calculated by using a spherical Earth projected to a plane:

$$d = R\sqrt{(\Delta\phi)^2 + (\cos(\phi_m)\Delta\lambda)^2},$$

where:

$\Delta\phi$ and $\Delta\lambda$ are the difference in latitude and longitude in radians, respectively. $\phi_m$ are in units compatible with the method used for determining $\cos(\phi_m)$. To convert latitude or longitude to radians use $1°=(\pi/180)$ radians. The square root may be omitted for computational efficiency since only relative distances are used in clustering.

The server can then use the distance between each of the locations by performing a clustering algorithm, such as k-means clustering or density-based spatial clustering of applications with noise (DBSCAN).

DBSCAN is a density-based clustering non-parametric algorithm: given a set of points in some space, it groups together points that are closely packed together (points with many nearby neighbours), marking as outliers points that lie alone in low-density regions (whose nearest neighbours are too far away).

Consider a set of points in some space to be clustered. Let $\varepsilon$ be a parameter specifying the radius of a neighbourhood with respect to some point. For the purpose of DBSCAN clustering, the points are classified as core points, (density-) reachable points and outliers, as follows:

A point p is a core point if at least minPts points are within distance $\varepsilon$ of it (including p).

A point q is directly reachable from p if point q is within distance $\varepsilon$ from core point p. Points are only said to be directly reachable from core points.

A point q is reachable from p if there is a path $p_1, \ldots, p_n$ with $p_1=p$ and $p_n=q$, where each $p_{i+1}$ is directly reachable from $p_i$. Note that this implies that the initial point and all points on the path must be core points, with the possible exception of q.

All points not reachable from any other point are outliers or noise points.

Now if p is a core point, then it forms a cluster together with all points (core or non-core) that are reachable from it. Each cluster contains at least one core point; non-core points can be part of a cluster, but they form its "edge", since they cannot be used to reach more points.

Reachability is not a symmetric relation: by definition, only core points can reach non-core points. The opposite is not true, so a non-core point may be reachable, but nothing can be reached from it. Therefore, a further notion of connectedness is needed to formally define the extent of the clusters found by DBSCAN. Two points p and q are density-connected if there is a point o such that both p and q are reachable from o. Density-connectedness is symmetric.

A cluster then satisfies two properties:

All points within the cluster are mutually density-connected.

If a point is density-reachable from some point of the cluster, it is part of the cluster as well.

DBSCAN uses two parameters: $\varepsilon$ and the minimum number of points required to form a dense region (minPts).

It starts with an arbitrary starting point that has not been visited. This point's $\varepsilon$-neighbourhood is retrieved, and if it contains sufficiently many points, a cluster is started. Otherwise, the point is labelled as noise. Note that this point might later be found in a sufficiently sized $\varepsilon$-environment of a different point and hence be made part of a cluster.

If a point is found to be a dense part of a cluster, its $\varepsilon$-neighbourhood is also part of that cluster. Hence, all points that are found within the $\varepsilon$-neighbourhood are added, as is their own $\varepsilon$-neighbourhood when they are also dense. This process continues until the density-connected cluster is completely found. Then, a new unvisited point is retrieved and processed, leading to the discovery of a further cluster or noise.

DBSCAN can be used with any distance function (as well as similarity functions or other predicates). The distance function (dist) can therefore be seen as an additional parameter and can be set to the geographical distance set out above.

The DBSCAN algorithm can be abstracted into the following steps:

1. Find the points in the $\varepsilon$ neighbourhood of every point, and identify the core points with more than minPts neighbours.
2. Find the connected components of core points on the neighbour graph, ignoring all non-core points.
3. Assign each non-core point to a nearby cluster if the cluster is an $\varepsilon$ neighbour, otherwise assign it to noise.

The algorithm can be expressed in pseudocode as follows:

```
DBSCAN(DB, distFunc, eps, minPts) {
    C := 0                              /* Cluster counter */
    for each point P in database DB {
        if label(P) ≠ undefined then continue    /* Previously processed in inner loop */
        Neighbors N := RangeQuery(DB, distFunc, P, eps)    /* Find neighbours */
        if |N| < minPts then {          /* Density check */
            label(P) := Noise           /* Label as Noise */
            continue
        }
        C := C + 1                      /* next cluster label */
        label(P) := C                   /* Label initial point */
        SeedSet S := N \ {P}            /* Neighbours to expand */
        for each point Q in S {         /* Process every seed point Q */
            if label(Q) = Noise then label(Q) := C    /* Change Noise to border point */
            if label(Q) ≠ undefined then continue     /* Previously processed (e.g., border point) */
            label(Q) := C               /* Label neighbour */
            Neighbors N := RangeQuery(DB, distFunc, Q, eps)    /* Find neighbours */
            if |N| ≥ minPts then {      /* Density check (if Q is a core point) */
                S := S U N              /* Add new neighbours to seed set */
            }
        }
    }
}
``` where RangeQuery can be implemented using a database index for better performance, or using a slow linear scan.

Considering the typical speed of vessels and sampling rate of their locations, the parameters of the algorithm can be set to cluster stationary points and keep points of moving vessels as noise. In particular, stationary points will be distanced from each other by about GPS accuracy, which is about 5 m. So points that are further distanced than 5 m can be considered to belong to a different cluster, that is, $\varepsilon=5$ m, for example. Other examples may use a different parameter, such as 1 m or 100 m. Further, waiting vessels will generate a large number of data points over time, so the minPts parameter can be set relatively high, such as 100, 1,000 or 10,000.

BSCAN visits each point of the database, possibly multiple times (e.g., as candidates to different clusters). For practical considerations, however, the time complexity is mostly governed by the number of regionQuery invocations. DBSCAN executes exactly one such query for each point, and if an indexing structure is used that executes a neighbourhood in $O(\log n)$, an overall average runtime complexity of $O(n \log n)$ is obtained. For example, $100 \log 100=460$ and $1000 \log 1000=6907$, which as a moderate increase over linear growth, which shows that the clustering is computationally efficient, since the complexity does not rise exponentially.

FIG. 3 shows two resulting clusters 306 and 307. When comparing FIG. 3 to FIG. 2, it can be seen that the clusters 306 and 307 cover an area that includes the groups of waiting vessels 206 and 207, respectively. Locations from vessel 205 including current location 305 and the corresponding trail, are not part of any cluster since the density of those points is too low to be clustered. Consequently, these points are considered noise. The same applies to vessel locations 303 and 304 and corresponding trails.

Port Area

Figure 4:
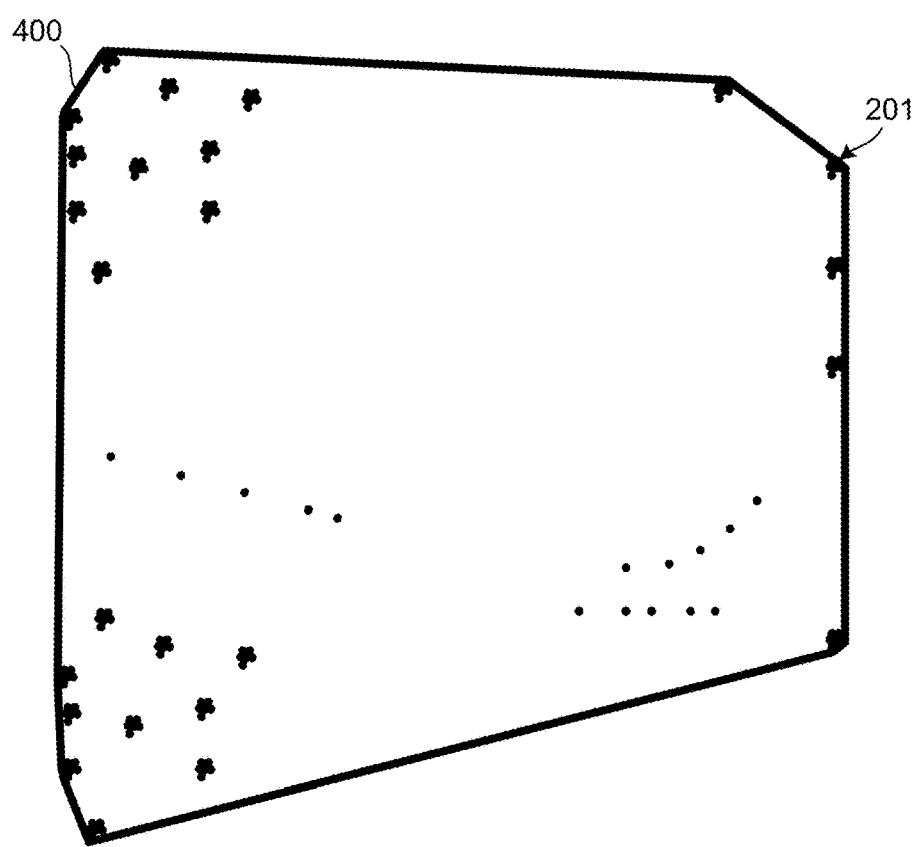
FIG. 4 illustrates the geographical location data from FIG. 4 with the determined port area.

The server then determines a port area that bounds the clusters 306 and 307 and the result is shown in FIG. 4, which illustrates a calculated port area 400. The port area 400 is called 'port area' because it is associated with this particular port. In that sense, port area 400 is not inside port 200 (see FIG. 2) but is the area where vessels are anchored, moored, idle or simply wait for a free berth in the port.

In this example, the server also includes all berths, such as 201. More particularly, the server selects the locations that are part of a cluster and locations of the berths, and performs a bounding algorithm to determine an area that bounds the selected locations. For example, the server performs a convex hull algorithm to determine a convex hull that bounds the selected points. In that example, the server determines an area that includes all selected points. The area may be in the shape of a polygon and the corners of the polygon may be defined by particular points in the clusters and the berths. So some corners of the polygon may be defined by the location of the berths and the historical locations of the vessels. However, some locations of the berths or historical locations may lie within the port area 400 and would therefore not be corners of the polygon, as otherwise the polygon would not be convex.

In one example, the server performs a convex hull algorithm by performing the Gift Wrapping algorithm or the Graham-Andrew's Algorithm. While it is not necessary that the port area 400 is convex, it has advantages such as computational efficiency and the property that any vessel that moves directly between two points within the port area 400 will not leave and re-enter the port area 400.

In a further example, the server generates an initial port area, such as a polygon that includes all berths of the port. The server then updates the initial port area by adding corners to the polygon to include the locations of the determined clusters. The server may include only one cluster at a time and then add further clusters. The server may also update the port area 400 periodically, such as once a month by clustering the location data that has been generated since the last update. In other examples, the server repeats the method and re-calculates the port area without regard to the previously calculated port area. This is particularly useful in cases where changes to waiting areas are likely to occur, such as due to port upgrades, dredging or changes to shipping channels.

Departure Detection

Once the port area 400 is calculated, the server determines tracking data indicative of movement of a tracked vessel. This determination is based on whether the tracked vessel is within the port area 400. For example, tracking data may comprise a flag that indicates that the vessel is at port or that the vessel is underway, that is, whether the vessel has departed. Importantly, while a vessel moves within the port area 400, such as between an anchorage and a berth, the tracking data indicates that the vessel is still at port and has not yet departed. Once the vessel's location is outside the port area 400, that is the vessel location has changed from within the port area to outside the port area, the tracking data indicates that the vessel has departed and is underway.

In this sense, the server may maintain a flag for each vessel. The flag may be stored as a Boolean variable on memory, such as hard disk, or as a field value in a database. The flag indicates whether the vessel is inside the port area or outside the port area. Each time the server receives an update on the location of the vessel, the server determines whether the vessel is inside the port area or outside the port area and compares the result to the flag. If the flag indicates the vessel is inside the port area but the current location is determined to be outside the port area, the server determines that the vessel has departed and sets the flag to indicate the vessel is outside the port area.

Estimated Time of Arrival

In one example, the server determines an ETA based on the tracking data. The ETA may be an absolute time calculated by determining a departure time as the time when the vessel's location was first determined to be outside the port area 400, plus an estimated trip duration. More particularly, the server obtains the destination for the tracked vessel, calculates a travel distance between the origin and the destination, obtains an average travel speed, which may be vessel specific, and divides the distance by the travel speed to calculate a trip duration. Finally, the server adds the trip duration to the departure time to calculate the ETA. In other examples, the ETA is relative, such as T-48 to indicate estimated arrival in 48 hours from now, for example.

It will now be appreciated that an incorrect determination of vessel departure (false positive) leads to a significant inaccuracy in the ETA. For example, if it takes three days for a vessel to wait, dock at the berth, unload and re-load and the vessel is incorrectly identified as having left the port after the first day, the ETA is incorrect by 2 days and the vessel will actually arrive at the next destination point 2 days late (i.e. 2 days after the incorrect ETA). With the method disclosed herein, this error can be reduced to an inaccuracy of only hours, such as less than 5 hours on average due to weather etc., since the occurrence of false positives is reduced, so that the ETA is now more accurate.

Location Filter

Returning to FIG. 1, it is noted that the location data shown relates to two ports 101 and 102 and there are two accumulations of waiting areas. In other examples, the location data only contains location data of vessels heading to one port. In one example, the server filters the location data. As described above, each record may be associated with a trip and each trip comprises a destination. The server can now select one port to determine the corresponding port area and then filter the records to only retrieve the location data that is associated with trips with that port as destination. As a result, the only accumulation in the data is near the destination port. Once the server has calculated the port area for that port, the server may move to the next port to calculate the next port area. The many different port areas may also be calculated in parallel because one port area does not depend on the result of another port area.

It is further noted that the location data also comprises locations of vessels that are underway anywhere between two ports. However, their location records would be relatively sparsely distributed, which means the clustering algorithm may not assign these points to any clusters. Therefore, the location data of vessels that are underway does not change the determined port area significantly. However, it is possible to filter the location data to only consider location data that is near a port.

In a further example, the server filters vessel data by speed. More specifically, in that example each historical location also comprises a value for current speed of the vessel. The server then selects only those records where the speed is below a predefined threshold, such as below 5 knots, or below 1 knot. This means only vessels that are not moving at cruising speed but are stationary or almost stationary are used for clustering. While this approach is useful in many cases, there may be scenarios where the speed data is not accurate. In those cases, the server may calculate a distance between two subsequent historical locations of that vessel and select only locations where the immediately prior location is within a predefined distance, such as within 180 m for an update interval of the location of 6 minutes, which relates to a speed of about 1 knot. In effect, this selects stationary or almost stationary vessels for clustering.

In yet a further example, the server selects a relatively small subset of locations from the available data. In particular, the server selects locations from vessels that have 'looped' into the port and back to the waiting area. This occurs where vessels head into port to dock at a berth but then there is an unexpected change and the berth is not available anymore. The vessel then has to return back to the waiting area, which is not uncommon. This 'looping' behaviour can be detected by a relatively conservative setting of perimeters or distances.

For example, when a vessel is within a first, smaller distance, such as 500 m of a berth, the vessel is flagged as being near a berth. If the same vessel is then detected outside that smaller distance but within a second greater distance, such as 10 km, but does not leave that second greater distance, it is flagged as having returned to a waiting area. If the vessel than comes within the first smaller distance, and is flagged as returned to waiting area, it is flagged as looped. The flags may be deleted once the vessel leaves the second, greater distance or after a period of time, such as 5 days to reduce errors. Once the vessel is flagged as looped, the recorded location data from the time the vessel first was within the second, greater distance is added to the dataset for clustering.

In another example, each vessel is associated with a destination port. If the vessels enters the port, docks at the berth, unloads and heads to a different port, the destination port of that vessel changes. But if the vessel returns back to a waiting area, the destination port does not change. So when the data is processed, if the destination port does not change, and the location of the vessel changes between nearby positions (such as within 5 km), a loop can be determined.

It is noted that the determination of the 'looping' behaviour can be performed entirely on historical data so that the server does not need to wait for the next update of the vessel location but can process the entire location history of that vessel at once and then move on to the next vessel in the historical data. The server repeats this process for all vessels, or for vessels that are selected for that port, such as vessels with trips that have that port as a destination. Or the server may repeat this process for all trips of any vessel and may filter the trips by destination port.

In yet a further example, the server may cluster historical data for multiple ports in one dataset and then associate each cluster with one of the ports. In most cases, all points of one cluster are associated with trips to the same port. Therefore, the server can, for each cluster, determine the associated port by determining the destination port associated with the points in that cluster. The server may use the majority destination port to avoid outliers or errors influencing the result. Once each cluster is associated with a port, the server can use those clusters to determine the port area for that port as described above.

Computer Implementation

Figure 5:
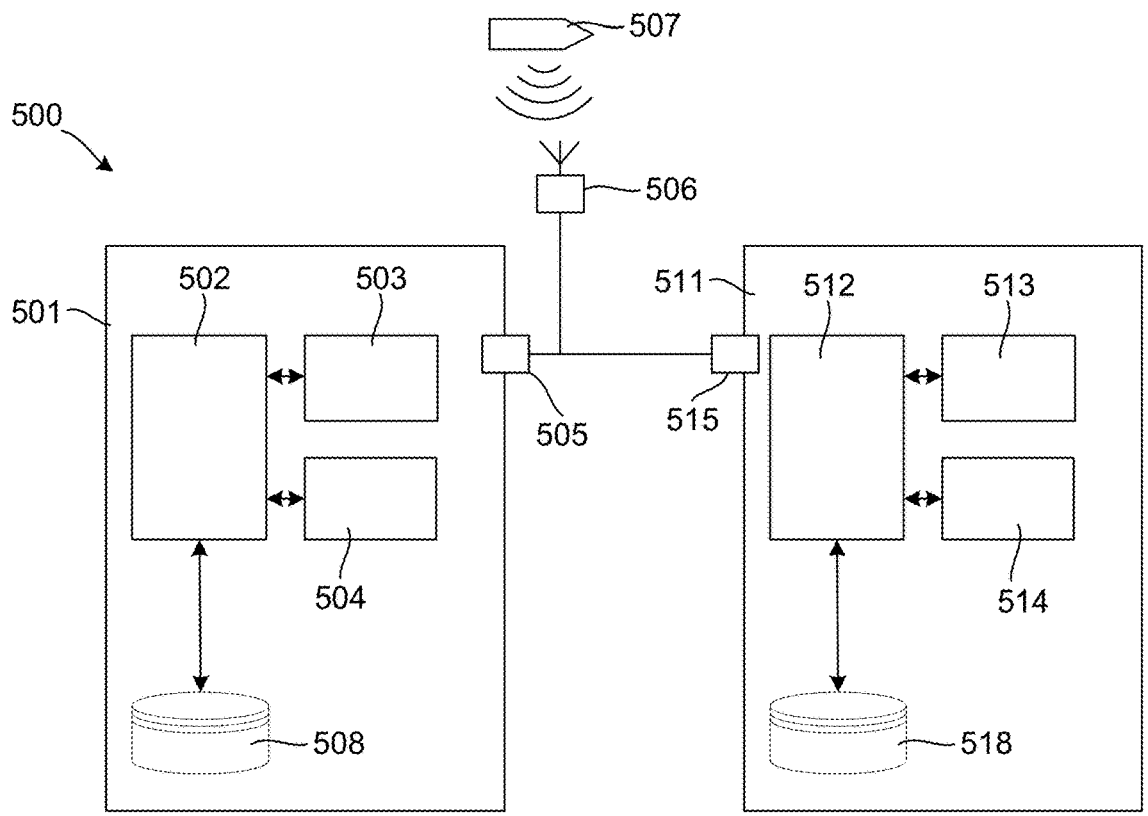
FIG. 5 illustrates an example computer network with two distinct hardware systems.

FIG. 5 illustrates a computer network 500 comprising a first computer system 501 and a second computer system 511. First computer system 501 comprises a processor 502, non-transitory program memory 503 and data memory 504, which may be transitory, such as random access memory (RAM) or non-transitory, such as a hard disk drive. Processor 502 executes program code stored on program memory 503, which causes processor 502 to perform the methods described herein, such as method 600 shown FIG. 6 and described below. The program code stored on memory 503 may also be referred to as a first software system. More particularly, the methods disclosed herein are implemented in a program language and then compiled into binary form and installed on program memory 503, for example. The steps previously described as being performed by the server, are therefore performed by processor 502 of first computing system 501. In other words, first computing system 501 is an example implementation of the server mentioned above.

First computer system 501 further comprises a communication port to receive location data from a location data receiver 506, which, in turn, receives the location data from a vessel 507 over wireless communication. As described above, vessel 507 may carry a GPS sensor and send the GPS coordinates wirelessly to receiver 506. Other sensors may equally be used, such as Global Navigation Satellite System (GLONASS), BeiDou or Galileo. The location determined by satellite navigation using these systems may be improved by assistance technology, such as assisted GPS. Other non-satellite based location system, such as inertial navigation systems or dead reckoning may equally be used for location determination.

In further examples, the geographic location data comprises data from the automatic identification system (AIS), which may be transmitted from each vessel to a terrestrial receiver (T-AIS) or to a satellite (S-AIS). The data from the various different receivers may be aggregated and provided over the Internet. In that way, processor 502 can receive the location data over the Internet, such as by calling API calls of a AIS data provider, such as MarineTraffic.com, Vesselfinder.com, or Spire Marine.

Processor 502 receives the geographic location data generated by receiver 506 through communication port 505, which maybe a wide area network (WAN) or local area network (LAN) interface. In other examples, processor 502 receives the location data from database 508 where historical location data is stored, such as recorded locations of all available vessels for the last year, for example.

Figure 6:
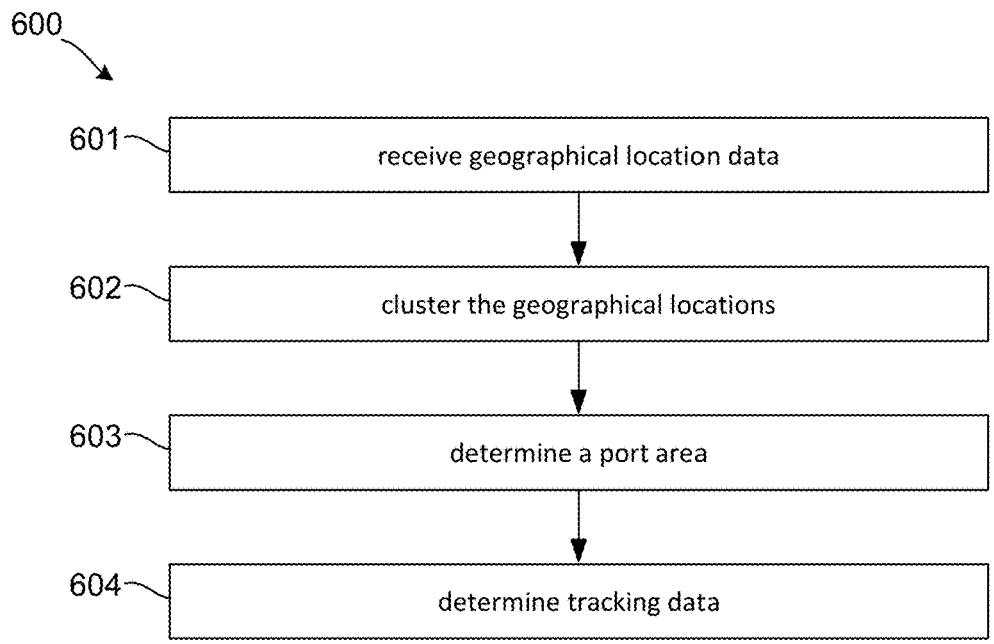
FIG. 6 illustrates a method for vessel tracking.

FIG. 6 illustrates a method 600 for vessel tracking in relation to a port as performed by processor 502. Once the processor received 601 the geographical location data, which is indicative of geographical locations of respective vessels, processor 502 clusters the geographical locations of the vessels to determine clusters. As set out above, processor 501 may determine the clusters through running a clustering algorithm, such as k-means or density-based spatial clustering of applications with noise (DBSCAN). Once the clusters are available, processor 502 determines a port area 400 as shown in FIG. 4. It is noted again that the port area 400 bounds the clusters, such that the locations that belong to the clusters are within the port area 400.

With the port area 400 at hand, processor 502 determines tracking data indicative of movement of a tracked vessel based on whether the tracked vessel is within the port area 400. For example, processor 502 determines that the vessel has moved from within to outside the port area 400 and in response to determining that the vessel has moved from within to outside the port area, processor 502 determines that the vessel has departed and is on its way to its destination. Processor 502 stores the determination that the vessel has departed, such as in the form of a flag, which is referred to as tracking data indicative of movement of the tracked vessel. Processor 502 may also send the tracking data to the second computer system 502.

Tracking Data Output

Once processor 502 has determined the tracking data, such as by detecting the departure of a vessel, processor 502 may generate an event to notify second computer system 511 of the detected departure. Second computer system also comprises a second processor 512, second program memory 513, second data memory 514 and a second database 518. Program code that is installed on second program memory 513 may also be referred to as the second software system. Second processor 512 may provide an API that processor 502 can call, such as by calling a web-API function at SecondComputerSystem.com/api/vesselDeparted?vesselID=123. The web location SecondComputerSystem.com may be replaced by an internet protocol (IP) address. As can be seen in this example, the API function call includes a vessel identifier vesselID, which is 123 in this case. The API function call is an event generated by processor 502 upon determining that a vessel has departed the port.

It is also possible that first computer system 502 exposes an API and second processor 512 calls an update request function. Upon determining that the vessel has departed, processor 502 generates the event in the form of a response to the update request. That is, the generated event may be a change in value of a return variable.

In response to receiving the tracking data, such as through the API, the second computer system 511 may perform an action, which is then said to be triggered by the event generated by the processor 502 of the first computer system 501.

While FIG. 5 illustrates an example computer network with two distinct hardware systems, it is noted that the described methods may equally be performed on the same hardware system, such that two software systems communicate with each other. In that sense, the first software system generates an event that triggers an action by the second software system. For example, the first and second computer systems 501 may be implemented on a cloud computing environment on a dynamically changing number of computing and storage instances. The API calls provided below may also be replaced by function calls, or inter-process communication or by storing files with tracking data on non-transitory data memory 504.

Action Trigger

Figure 7:
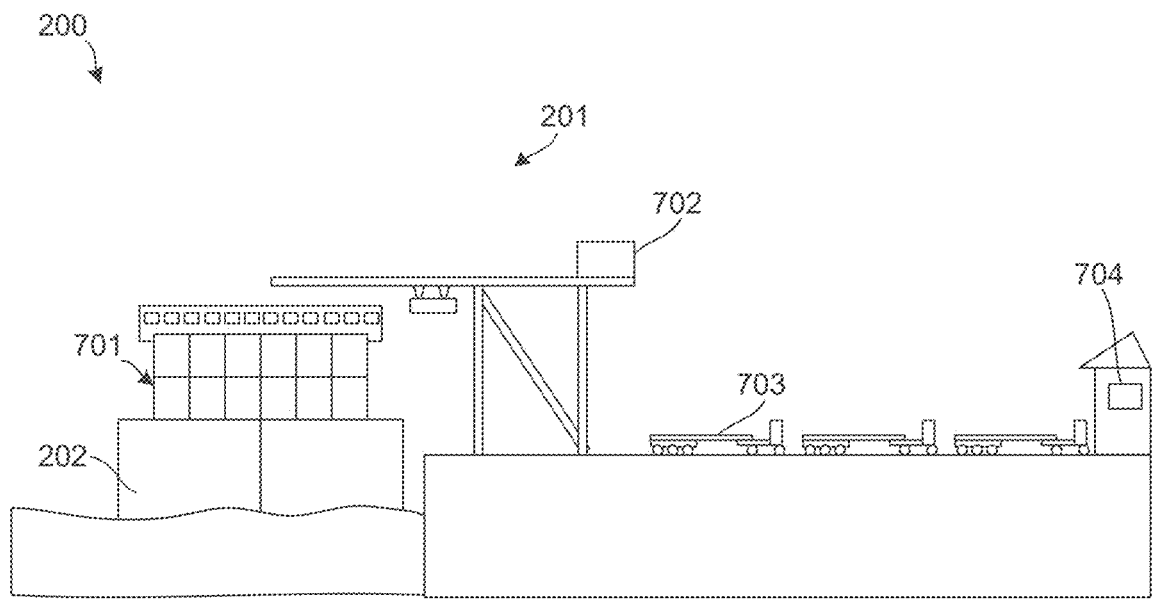
FIG. 7 illustrates the port from FIG. 2 in more detail.

FIG. 7 illustrates port 200 from FIG. 2 in more detail including vessel 202 docked at berth 201. In this example, vessel 202 is a container ship transporting a load of containers 701. Port 200 further comprises a gantry crane 702 and a fleet of trucks, such as example truck 703. Once the vessel 202 is docked, the gantry crane 702 loads the containers onto truck 703 to transport them from port 200 inland. There may also be intermediate storage It may be fairly typical way for the cargo of a large 18,000 twenty-foot equivalent unit (TEU) container ship to be distributed over 19 container trains (74 TEU each), 32 barges (97 TEU each) and 1,560 trucks (1.6 TEU each, on average). This shows that the process of getting the containers onto the next mode of transport at minimal time is a significant technical challenge as the containers need to be moved in an optimal way.

Port controller 704 performs port control based on the tracking data generated by processor 502. It is also possible that port controller 704 performs the method 600 in FIG. 6 and generates the tracking data. The determination of the departure of a vessel triggers a range of actions. These actions may also be timed based on the departure or the ETA. For example, gantry crane 702 is remote controlled by port controller 704 and port controller 704 generates control signals for gantry crane 702 to move gantry crane 702 to berth 201, such that it arrives at the ETA, that is, at the same time, or slightly earlier, that the vessel 202 is estimated to arrive.

Similarly, truck 703 may be remote controlled and port controller 704 generates control signals to control truck 703 to arrive at berth 201 at the ETA. In the case of a large number of trucks, such as over 1,000, a significant number of control signals are generated by port controller 704. There may also be a mapping between specific containers to specific trucks and port controller 704 may have information on where the containers are stored on vessel 202. Therefore, port controller 704 can determine an order or sequence of trucks to receive the containers as they are unloaded from the vessel. Again, port controller 704 generates control signals for the trucks accordingly. Port controller 704 may also generate signals that are to be provided to the drivers of the trucks to advise them of when to arrive at berth 201.

While the above example shows how technically complex the automatic control of port equipment is, it should be noted that typical ports unload multiple vessels at the same time, which increases the complexity in the use of equipment even further. It is further noted that the accurate estimation of the arrival time enables the triggering of port actions. In other words, previous estimates were so inaccurate, that automatic control of port equipment would have led to technical difficulties, such as increased movement of vehicles leading to increased wear and tear and fuel consumption as well as blocking operations for other vessels. However, with the more accurately estimated arrival time, port equipment can be controlled automatically for all expected vessels simultaneously, so that the entire operation of the port is optimised. In that sense, wear and tear and fuel consumption is reduced. Further, the time for unloading cargo from the vessel onto trucks and then leaving the port on land, for example, is reduced because equipment is immediately ready at the estimated arrival time.

With an optimised port operation it is also possible to schedule berths further in advance. This means vessels can plan their trips more accurately, which would also mean that waiting times are reduced. This would lead to significant reduction in fuel consumption for idling engines during the wait. Further, vessels can reduce their travel speed if they are notified that the berth will not yet be available, leading to further reduction in fuel consumption.

While the example of FIG. 7 has been described with reference to cranes, vessels and trucks, it is to be understood that other types of port equipment can be controlled automatically by port controller 704 and triggered by the determination of a vessel departure. For example, the vessel may be a bulk carrier, such as for coal, oil, grain, or chemicals. Such a vessel requires bulk goods equipment and potentially trains to transport the bulk goods inland. This equipment and the trains may be remotely controlled by the port controller 704 and triggered by the determination of vessel departure.

In yet a further example, the second software system is a cargo management system that tracks a large number of consignments, containers or shipments along multi-modal transport routes. In that case, the first software system may create an event to update the current status of the consignment, container or shipment in the second software system. For example, the status of a consignment, container or shipment may be changed by an action of the second software system triggered by the first software system, to indicate that the vessel, on which the current consignment, container or shipment is currently being transported, has left the port of origin. Further, the ETA at the destination port may be stored in association with that consignment, container or shipment. Also, the second software system may calculate the ETA at the final delivery destination by adding the estimated duration of further modes of transport to the ETA at the destination port.

Port Area Correction

Figure 8:
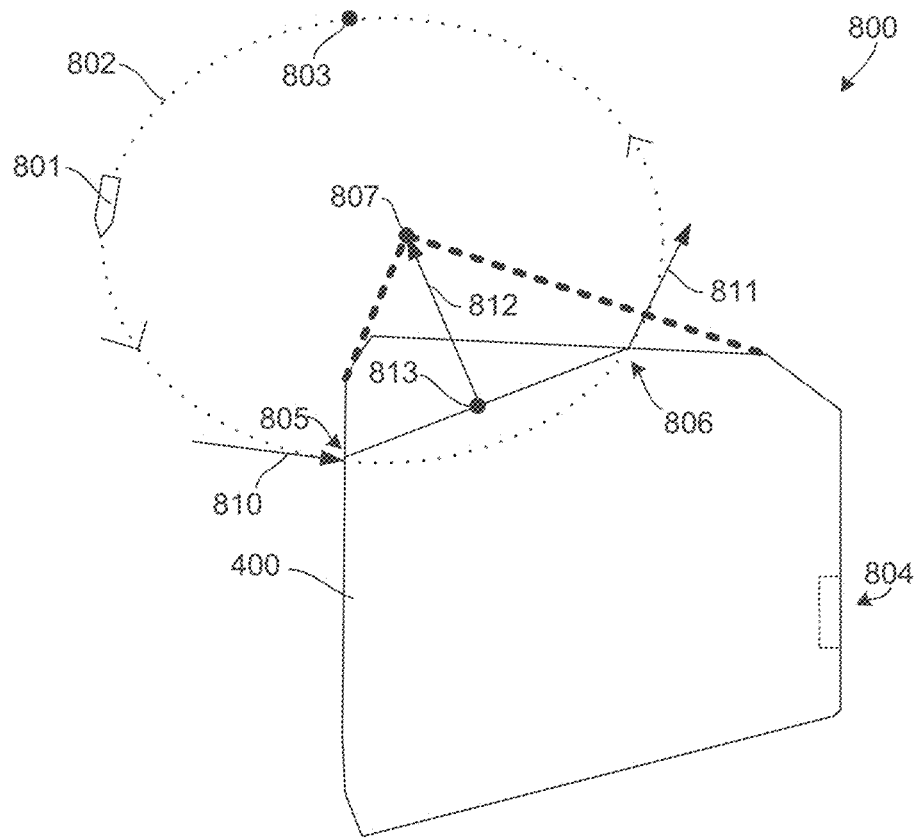
FIG. 8 illustrates a vessel movement scenario.

FIG. 8 illustrates a vessel movement scenario 800, comprising a vessel 801 that is moving along path 802 as indicated by arrows. The path 802 is shown as an ellipse but can have any other shape. Vessel 801 travels from a waiting area 803 towards a berth 804 and enters port area 400 (determined as described above) at entry point 805. However, berth 805 is no longer available, so vessel 801 exits the port area 400 at exit point 806 and returns to waiting area 803. It is now clear to see that port area 400 does not include waiting area 803, which may be a result of insufficient location data, such that the waiting area 803 was not in one of the determined clusters.

Figure 9:
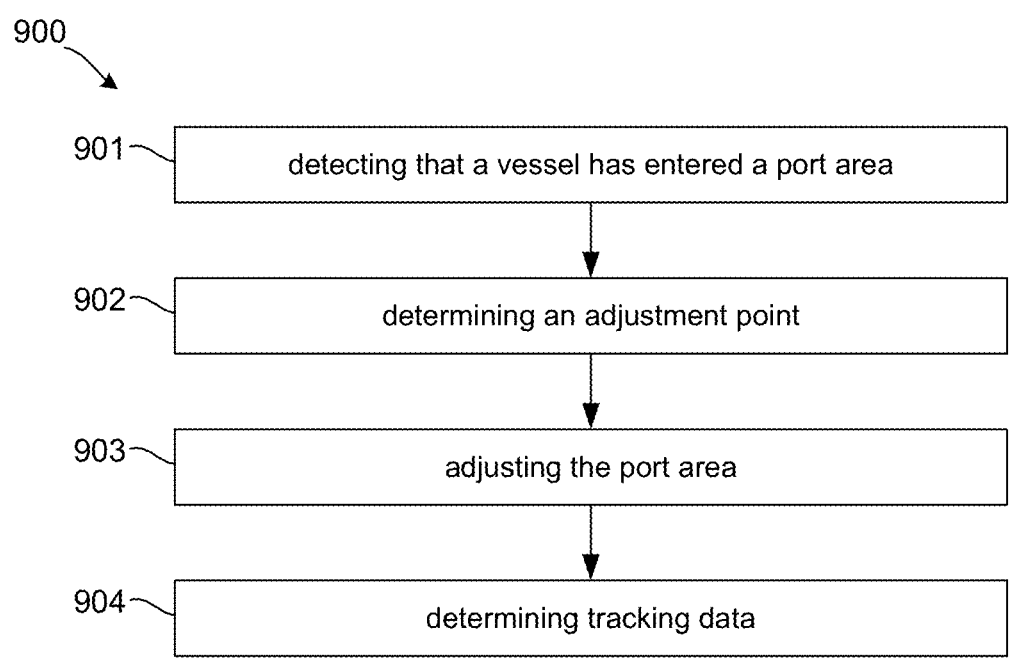
FIG. 9 illustrates a method for vessel tracking and in particular, for improving the port area.

FIG. 9 illustrates a method 900 for vessel tracking and in particular, for improving the port area 400 as performed by processor 502. processor 502 detects 901 that vessel 202 has entered the port area 400, determines 902 an adjustment point 807 and adjusts 903 the port area 400 to include the adjustment point. For example, at step 903 processor 502 adds the adjustment point 807 to the set of locations and re-calculates the convex hull, now also including the adjustment point 807, as indicated by the dashed line 808, where adjustment point 807 has become a corner of the polygon defining port area 400.

In step 902, processor 502 calculates the adjustment point 807 based on an entry direction of travel of the vessel 801 indicated at 810, and based on an exit direction of travel of the vessel 801 indicated at 811. More particularly, processor 502 calculates a vector 812 based on the entry direction 810 and the exit direction 811 and adds the vector 812 to a centre point 813 that is located centrally between the entry point 805 and the exit point 806. Vector 812 may be a mean vector of the entry direction 810 and the exit direction 811. Entry direction 810 and exit direction 811 may also be represented by vectors with a vector length being indicative or proportional to the speed of the vessel in knots when the vessel entered or exited the port area 400, respectively.

For example, processor 502 may calculate an angle between the vectors 810 and 811, half the result and add it to the angle of the entry direction 810. Processor 810 then adds the length of both vectors 810, 811, halves the result and uses that as the length of the vector 812. Processor 502 may also scale vector 812 by a learning or correction factor, which may be more than 1 for aggressive correction but potential over-correction or less than 1 for conservative correction but potential under-correction. For example, the weighting may be 0.5 or 1.5. It is noted that for a scaling of 1, the correction is by about 1 nautical mile from the centre point 813 if the vessel entered and exited the port area 400 at a speed of 1 knot.

In step 901, processor 502 may also determine, based on the received historical location data of vessel 202, whether vessel 202 has moved in a 'loop' as shown in FIG. 8. Processor 502 can then use this information to only select location data from multiple vessels that are related to such a loop and exclude location data from vessels that entered the port area 400 to dock at a berth and exiting port are 400 on their way to their destination (without moving in a loop).

In order to select the appropriate location data, processor 502 determines whether a particular vessel has entered the port area 400 twice. In other words, detecting that vessel 202 has entered a port area at the entry point 805 and exited the port area at the exit point 806 (i.e. moved in a loop) is conditional on that the vessel having entered the port area a second time. For that purpose, processor 502 may keep a data field for each vessel that counts the number of port area entries, or a flag that indicates whether the associated vessel has already entered the port area once. If the flag is not set and vessel 202 enters the port area 400, processor 502 does not use the location data from that vessel for port area correction and sets the flag. It is noted that the historical location data is still stored. If the flag is set and vessel 202 enters port area 400, processor 502 uses the location data from the moment the flag was set (including the entry point 805 at the setting of the flag) and the last exit point 806 for the correction algorithm described above.

It is noted that the described selection of location data may be relatively restrictive in the sense that there may be a high false-negative rate and location data is excluded despite being useful for port area correction. However, this does not reduce the accuracy of the method significantly in cases where location data from a large number of vessels is available since there are many more vessels that will be detected as having 'looped'. As a result, there will be sufficient location data to correct the port area 400 accurately.

Once processor 502 has adjusted the port area 400 to include adjustment point 807, processor 502 determines tracking data indicative of movement of a tracked vessel based on whether the tracked vessel is within the port area, as described above. Again, processor 502 may generate events and trigger actions in response to determining that a vessel has departed from the port.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:
1. A method for vessel tracking, the method comprising: detecting that a vessel has entered a port area at an entry point and exited the port area at an exit point, the port area defined by a bound of the port area, and the port area comprising at least a port and a waiting area outside the port;

determining a centre point located between the entry point and the exit point;

determining an adjustment point at a terminal point of a vector extending from the centre point, the vector determined based on an entry direction of travel of the vessel at the entry point and an exit direction of travel of the vessel at the exit point;

adjusting the bound of the port area by including the adjustment point as a corner of the bound of the port area;

determining tracking data indicative of movement of a tracked vessel based on whether the tracked vessel is within the port area.

2. The method of claim 1, wherein the port area comprises a polygon and including the adjustment point as the corner of the bound of the port area comprises using the adjustment point as a corner of the polygon.

3. The method of claim 2, further comprising:
receiving geographical location data indicative of geographical locations of respective vessels, at least a first vessel of the vessels berthed at the port and at least a second vessel of the vessels at the waiting area outside the port;
clustering the geographical locations of the respective vessels to determine clusters; and
determining the bound of the port area that bounds the clusters.

4. The method of claim 3, further comprising determining corners of the polygon to bound the clusters by the polygon.

5. The method of claim 4, wherein the polygon comprises a convex hull of the geographical locations in the clusters.

6. The method of claim 3, further comprising:
initializing the port area with an initial port area; and
adjusting the initial port area based on the clusters to determine the bounds of the port area.

7. The method of claim 1, wherein the vector is a mean vector of the entry direction and the exit direction.

8. The method of claim 1, wherein detecting that a vessel has entered a port area at the entry point and exited the port area at the exit point is conditional on that the vessel having entered the port area a second time, wherein the second time is within a predefined time period from a first time the vessel has entered the port area.

9. The method of claim 1, wherein determining the tracking data comprises detecting a departure of the tracked vessel and detecting the departure of the tracked vessel comprises detecting vessel movement from within the port area to outside the port area.

10. The method of claim 9, further comprising determining an estimated time of arrival based on detecting the departure of the tracked vessel.

11. The method of claim 9, wherein the departure of the tracked vessel is detected by a first software system and the method further comprises generating, by the first software system, an event to notify a second software system of the detected departure of the tracked vessel.

12. The method of claim 11, further comprising, triggering, by the event, an action performed by the second software system.

13. A non-transitory computer readable medium with software code stored thereon that, when executed by a computer, causes the computer to perform the method of claim 1.

14. A computer system for vessel tracking, the computer system comprising a processor configured to:
detect that a vessel has entered a port area at an entry point and exited the port area at an exit point, the port area defined by a bound of the port area, and the port area comprising at least a port and a waiting area outside the port;
determine a centre point located between the entry point and the exit point;
determine an adjustment point at a terminal point of a vector extending from the centre point, the vector determined based on an entry direction of travel of the vessel at the entry point and an exit direction of travel of the vessel at the exit point;
adjust the bound of the port area by including the adjustment point as a corner of the bound of the port area; and
determine tracking data indicative of movement of a tracked vessel based on whether the tracked vessel is within the port area.

* * * * *